United States Patent [19]

Calim

[11] 3,874,189

[45] Apr. 1, 1975

[54] MACHINE FOR PRODUCING FROZEN CONFECTIONS

[76] Inventor: Thomas F. Calim, P.O. Box 158, Jackson Center, Ohio 45334

[22] Filed: May 2, 1973

[21] Appl. No.: 356,398

[52] U.S. Cl.................. 62/306, 62/70, 220/63, 222/406
[51] Int. Cl................................................ B01f 3/04
[58] Field of Search ......... 62/69, 70, 306, 307, 308; 222/342, 394, 406; 220/63; 141/114

[56] References Cited
UNITED STATES PATENTS

| | | | |
|---|---|---|---|
| 2,087,648 | 7/1937 | Lord | 62/70 |
| 3,256,100 | 6/1966 | Bernstein et al. | 99/136 |
| 3,419,193 | 12/1968 | Stewart et al. | 220/63 R X |
| 3,656,316 | 4/1972 | Stock | 62/70 |

FOREIGN PATENTS OR APPLICATIONS

| | | | |
|---|---|---|---|
| 1,238,514 | 7/1971 | Great Britain | 62/342 |

*Primary Examiner*—William E. Wayner
*Assistant Examiner*—W. E. Tapolcai, Jr.
*Attorney, Agent, or Firm*—Palmer Fultz, Esq.

[57] ABSTRACT

A machine for producing frozen confections such as ice cream, or the like, wherein liquid mix is delivered from a storage tank through a freezing chamber to a draw-off valve from which the frozen mix is dispensed to cones or cups. The machine is characterized by a mix tank arrangement which utilizes disposable flexible bags removably confined within a rigid container which arrangement eliminates the necessity of returning mix tanks to the dairy for sterilization and refill. The machine is further characterized by a mix tank arrangement which utilizes a gaseous propellant to agitate the mix as well as to propel the mix through the machine thereby achieving homeogenity of mix without the need for special shaking machines.

4 Claims, 5 Drawing Figures

FIG. 1.
FIG. 2.
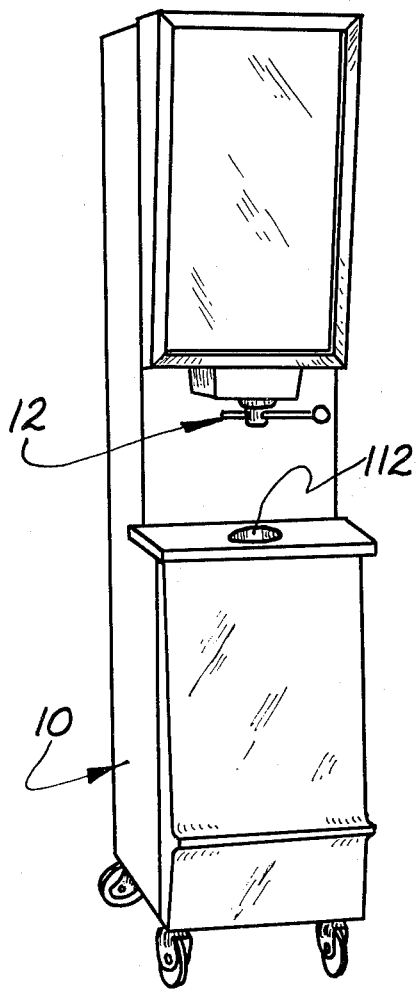
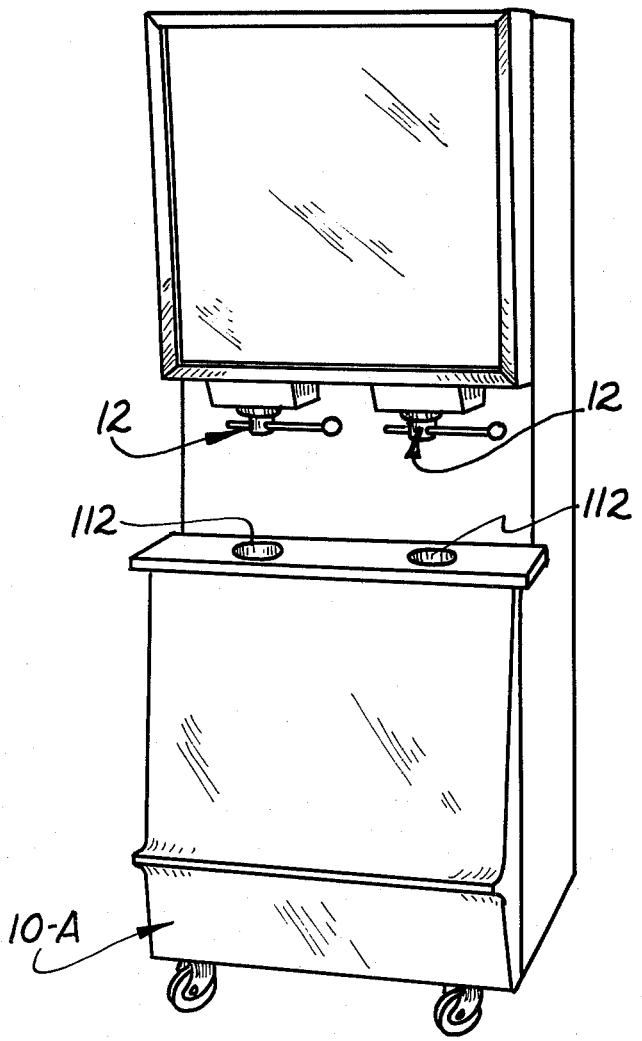

MACHINE FOR PRODUCING FROZEN CONFECTIONS

BACKGROUND OF THE INVENTION

This invention relates generally to machines for producing frozen confections such as soft ice cream or the like.

In general, the machine of the present invention is of the type used by soft ice cream vendors and sandwich shoppes for freezing mix used to fill cones or cups with soft ice cream, the portions of the ice cream being released from the dispensing valve of the machine immediately prior to serving the customer.

Machines of this general type comprise an upright frame, the lower portion of which includes a storage cabinet for one or more pressurized mix tanks which are filled with a liquid mixture supplied by the dairy. Machines of this type further include a freezing chamber to which the mix delivered from the previously mentioned tank and wherein the mix is further chilled to stiffen its consistency to a soft ice cream state.

The soft ice cream is released from the freezing chamber by means of a draw-off or dispensing valve which is operated by the vendor to dispense servings of frozen mix to the cone or cup in controlled amounts.

In machines of this general type a problem has been present in the art in that the storage containers for the mix which are supplied to the vendor by the dairy, require return to the dairy, after use, for sterilization and refilling. Also it has been necessary for the vendor to go through a shaking operation, requiring special shaking apparatus, for each of the mix tanks prior to installing the tank in the soft ice cream machine if he wished to refill the tank himself.

Another disadvantage has been inherent in machines in the prior art in that it has been necessary for vendors to go through a special charging operation with respect to the new mix tank prior to installation of the same in the machine. The purpose of such charging operation was to add a "freon food propellant," known as Freon 115 and $N_2O$ to each of the tanks prior to installing same in the machine to insure the proper overrun in the mix.

SUMMARY OF THE INVENTION

In accordance with the present invention, the ice cream machine is provided with a novel mix tank arrangement which completely eliminates the necessity of returning the mix tank to the dairy for sterilization and refilling. Such troublesome and costly procedures are eliminated in one embodiment by the packaging of the mix, by the dairy, in disposable flexible bags which are delivered to the vendor for refrigerated storage. When it becomes necessary for the vendor to refill a machine all that is necessary is to remove the exhausted flexible bag presently in the machine and install a new one filled with mix inserting same in a rigid permanent container that need not be returned to the dairy.

As another aspect of the present invention the machine is provided with a novel mix container construction which eliminates the necessity of the vendor shaking the container in a special shaking machine, such novel container construction generally comprises a gas inlet tube provided with a release orifice means which extend throughout the mix. The inlet of such tube is connected to a source of gas such as Freon 115 commonly used in aerosol foods as well as nitrous oxide ($N_2O$). Such gas heretofore has been used as propellant and for desired overrun with the Freon 115 serving to add stability to the product. However, in accordance with the present invention the novel container arrangement utilizes the admission of gases in such a manner to vigorously agitate and stir the mix thereby eliminating the need for previously required shaking operation in a special shaking machine.

As another aspect of the present invention, the previously mentioned flexible bag arrangement is combined with the previously mentioned gas inlet mixing tube construction so as to provide both the advantages of non-returnability of the container as well as the elimination of the need for prior shaking of the containers by the vendor.

Further objects and advantages of the present invention will be apparent from the following description, reference being had to the accompanying drawings wherein a preferred form of embodiment of the invention is clearly shown.

BRIEF DESCRIPTION OF THE DRAWINGS

FIG. 1 is a perspective view of a single unit ice cream machine constructed in accordance with the present invention;

FIG. 2 is a perspective view of a multiple unit ice cream machine constructed in accordance with the present invention;

DESCRIPTION OF THE PREFERRED EMBODIMENT

Referring in detail to the drawings, FIG. 1 illustrates a single station machine for dispensing ice cream or the like whereas FIG. 2 illustrates a dual machine for dispensing ice cream portions simultaneously from two stations.

Figure 3:
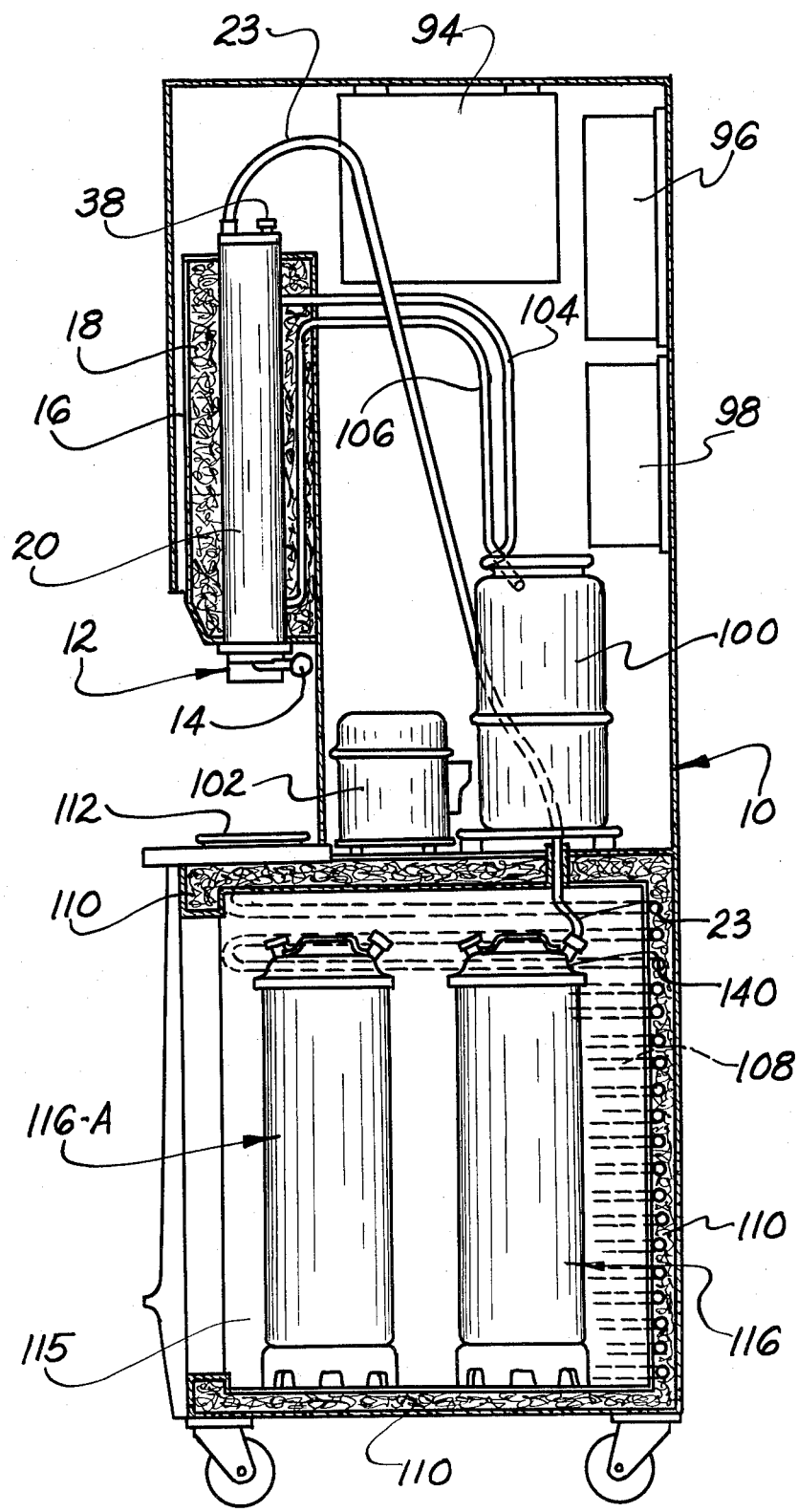
FIG. 3 is a partial side sectional view of a typical unit of one of the machines of the preceding figures, the section being taken along a vertical plane through the centerline of the machine.

Referring next to FIG. 3 which is a side sectional view through one of the stations of the machines of the preceding figures, it will be noted that the apparatus comprises an upright frame means 10 that includes side walls that form a refrigerated storage compartment 115. This storage compartment serves to hold an active mix container indicated generally at 116 as well as a standby mix container 116-A.

With continued reference to FIG. 3 active mix container 116 releases liquid mix via a mix delivery conduit 20 which is connected to the inlet passage 36 of a heat exchanger or freezing chamber indicated generally at 16.

Mix container 116 is pressurized by a suitable gas such as Freon 115 and nitrous oxide via line 23 which communicates with a pressurized source of gas, not illustrated.

With continued reference to FIG. 3, storage compartment 115 includes wall insulation indicated at 110 and is cooled by a cabinet refrigeration system including refrigerant coils 108, storage compressor 102, and a storage condensor 96. Such refrigeration system for the storage compartment is of a conventional type and is provided with the usual refrigeration controls for maintaining a constant preset temperature in the storage compartment.

Referring again to the novel cooling chamber indicated at 20 in FIG. 3, surrounded by a protective jacket 16 with the space between the chamber and jacket filled with suitable insulation consisting of fiberglass or the like.

Details of the internal structure of cooling chamber and heat exchanger 20 are illustrated and described in detail in my co-pending application Ser. No. 356,399 filed May 2, 1973.

A dispensing valve indicated generally at 12 and including a dispensing lever 14 is provided at the outlet of cooling chamber 20. Such valve 12 is described in my co-pending application Ser. No. 356,400 filed May 2, 1973, now U.S. Pat. No. 3,828,572.

Figures 4, 5:
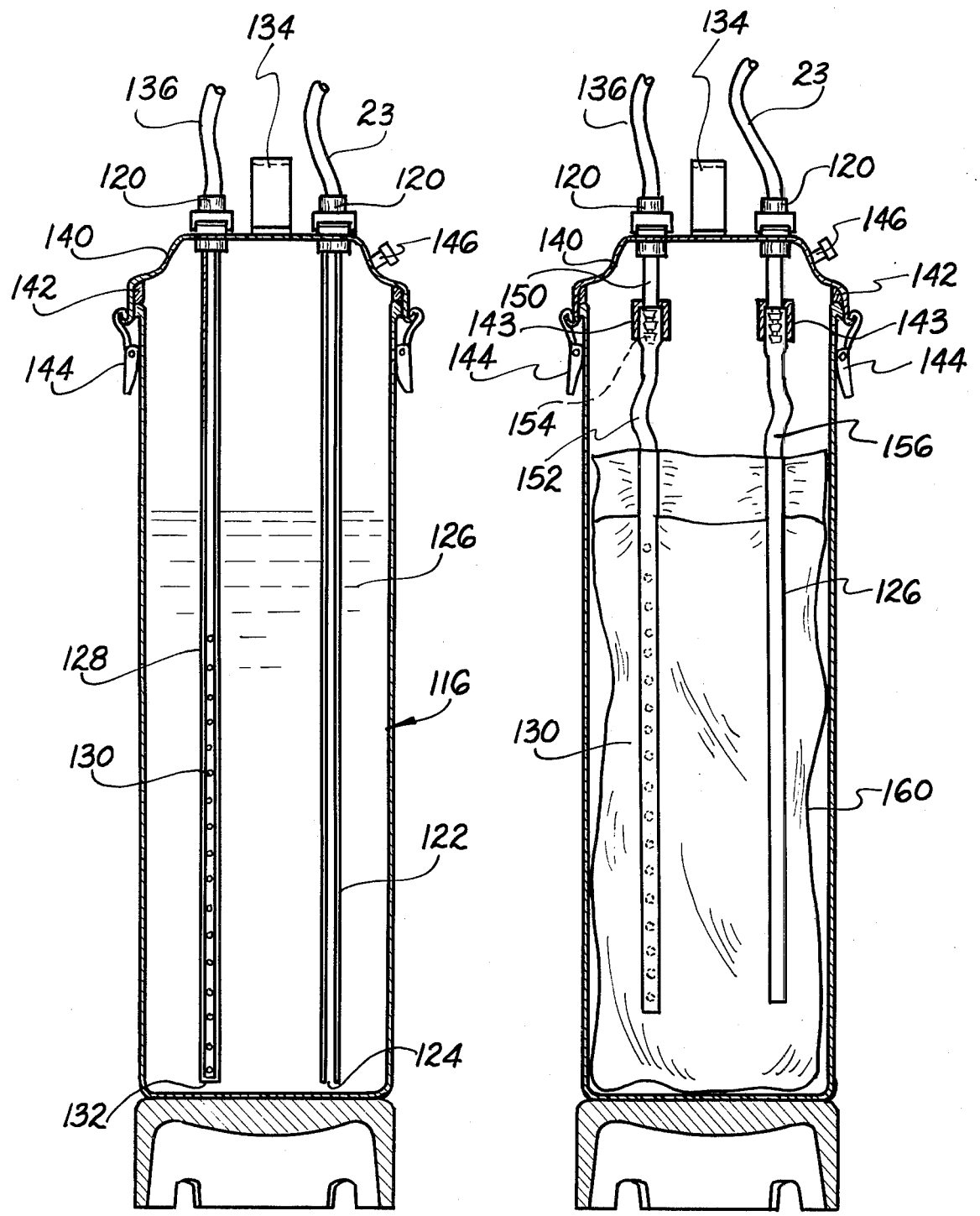
FIG. 4 is a side sectional view of a mix container constructed in accordance with the present invention with the section being taken along a vertical plane through the centerline of the mix container.
FIG. 5 is a side sectional view of a modified mix container constructed in accordance with the present invention, with the section being taken along a vertical plane through the centerline of the container.

Reference is next made to FIGS. 3 and 4 which illustrate a novel mix tank apparatus which functions in a unique manner to agitate the mix and deliver same to the previously described cooling chamber 16.

As seen in FIG. 4, one modification comprises a mix container 116 which includes a lid 140 that can be removed at the lid latches 144 whereby the container 116 can be cleaned, sterilized and refilled with mix when it is returned empty to the dairy.

Container 116, FIG. 4, is mounted in refrigerated compartment 115 with a mix outlet tube 122 connected to mix delivery line 23 at a lid fitting 120, said outlet tube including a mix inlet 124. Container 116 further includes a gas inlet tube 128 preferably having a closed lower end 132 and an upper end connected to a gas delivery line 136. Line 136 is in turn connected to a source of pressurized gas not illustrated, with a preferred gas being a mixture of Freon 115 and Nitrous Oxide ($N_2O$). These gases are F.D.A. approved for use in aerosol foods, and such have been commonly used as a propellant for dispensing foods from aerosol cans.

In accordance with the present invention, the above mentioned gaseous mixture functions to agitate the mix bath 126 and thereby maintain the mix in a homogeneous state. As a result the need for stirring apparatus in the cooling chamber section is eliminated and the mix can be delivered through the relatively small and thermally efficient mix delivery tubes 22 previously described.

Agitation of mix bath 126 is effected by providing orifice means 130 through the wall of gas delivery tube 128, FIG. 4, with the result that the pressurized gaseous mixture from line 23 is released in jet streams throughout the bath of mix thereby maintaining same in a mixed homeogeneous state.

It should be mentioned that in the operation of prior machines it has been necessary for the vendor to shake the mix container in a special shaking machine prior to installation in the machine which of course is time consuming and necessitates extra equipment in the form of a shaking machine.

Referring next to FIG. 5 this embodiment represents a modified apparatus and method for handling, agitating and dispensing mix to the cooling chamber 116 of FIG. 2. Here the mix 126 is supplied by the dairy in disposable flexible bags 160, formed of suitable plastic material. Such bags include gas inlet tubes 152 and mix discharge tubes 156 which are closed by sterilized caps by the dairy. As was the case with the embodiment of FIG. 4, the gas inlet tube 152 is provided with a plurality of longitudinally spaced gas discharge orifices 130 which agitate the mix bath 126 and thereby maintain its homeogenity.

In operation of the embodiment of FIG. 5, the operator needing a new container of mix need only unlatch the clamps 144, lift lid 140 and disconnect the empty flexible bag 160 at the nipple and hose connections 143 and 150–154. The empty bag 160 is then removed from container 116 and a new filled flexible bag is next placed in the container and connected to lines 136 and 120 at the nipple connections 150–154.

It will now be understood that with the disposable bag embodiment of FIG. 5 there is the further advantage that the metal mix container 116 need not be returned to the dairy for refill, nor is it necessary to sterilize the metal container since the inner bag 160 is supplied by the dairy in a sterilized condition.

Referring again to FIG. 5, it should be mentioned that as a further modification the flexible bag embodiment could be pressurized externally by the admission of compressed air at the air inlet 146 which would be connected to a source of compressed air, not illustrated. In such instances, however, the product would be forced out in the same manner as use of pressure in the bag. However, the mix 126 would not be subjected to the advantageous mixing effect from the jets of compressed gas leased from orifices 130 in tube 152 in the manner previously described. The other advantages of the disposable bag system would however be realized.

While the form of embodiment of the present invention as herein disclosed constitutes a preferred form, it is to be understood that other forms might be adopted.

I claim:

1. A machine for dispensing soft ice cream or the like comprising, in combination, frame means; heat exchanger means for chilling a mix; a metering valve for sequentially dispensing portions of said mix from said heat exchanger means; a refrigerated storage compartment on said frame means; a pressurized mix tank mounted in said storage compartment and comprising a tank inlet and a tank outlet; a flexible mix bag removably mounted in said mix tank and including a sanitary bag interior sealed from said tank and a bag outlet; gas delivery conduit means for delivering a flow of gas to pressurize said mix and extending outwardly through said tank inlet to a source of pressurized gas; mix delivery conduit means communicating with said bag outlet means and extending outwardly through said tank outlet to said heat exchanger means; and disconnect means in said conduit means for connecting and disconnecting mix bags to said conduit means.

2. The machine defined in claim 1 wherein said flexible mix bag includes a bag inlet; and wherein said gas delivery conduit means communicates with said bag inlet.

3. The machine defined in claim 2 wherein the gas delivery conduit means includes an inner conduit portion provided with gas discharge orifice means for discharging gases within the mix.

4. The machine of claim 1 wherein said metering valve includes a valve inlet in direct communication with outlets of said heat exchanger means.

* * * * *